(Model.)
C. SCHAEFER.
Shoemaker's Measure.
No. 234,205.  Patented Nov. 9, 1880.
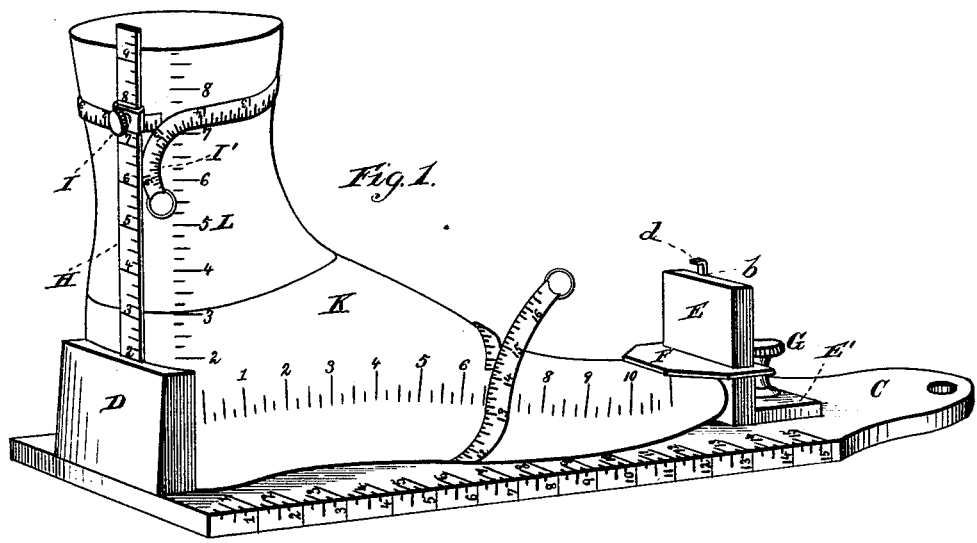
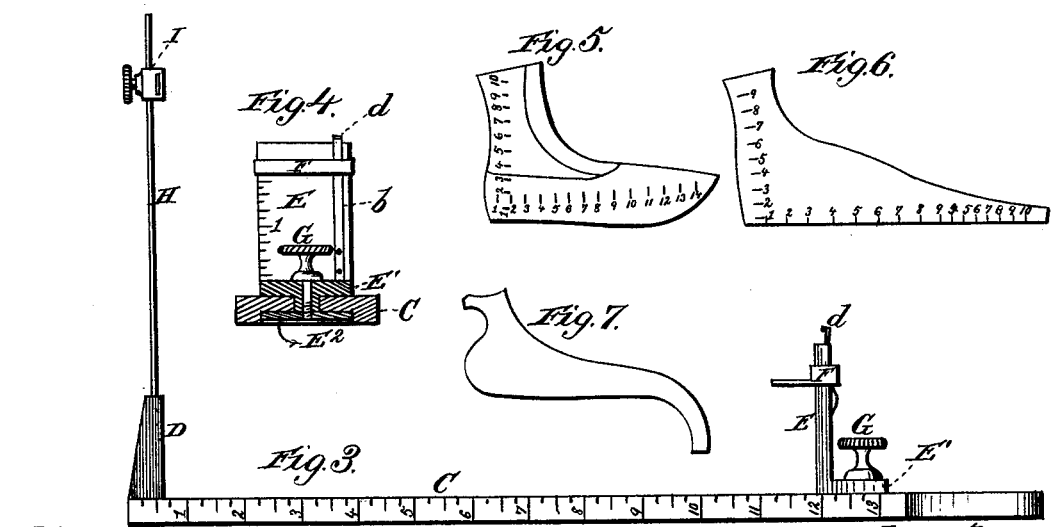
Witnesses:
Robert Everitt
J. P. Littell
Inventor:
Charles Schaefer
by C. A. Snow & Co.
Attorneys.

UNITED STATES PATENT OFFICE.

CHARLES SCHAEFER, OF TOLEDO, OHIO.

SHOE-MAKER'S MEASURE.

SPECIFICATION forming part of Letters Patent No. 234,205, dated November 9, 1880.

Application filed October 8, 1880. (Model.)

*To all whom it may concern:*

Be it known that I, CHARLES SCHAEFER, of Toledo, in the county of Lucas and State of Ohio, have invented certain new and useful Improvements in Measures for Making Boots and Shoes; and I do hereby declare that the following is a full, clear, and exact description of the construction and operation of the same, reference being had to the accompanying drawings, forming a part of this specification, in which—

Figure 1 is a view, in perspective, of my improved measure for boots and shoes. Fig. 2 is a plan view. Fig. 3 is a side elevation; and Fig. 4 is a sectional detail view, showing an elevation of the toe-gage forming a part of the measure.

This invention relates to foot-measures for shoe-maker's use; and it consists of the improved features of construction and combination hereinafter fully described, and particularly pointed out in the claims.

Referring by letter to the accompanying drawings, C designates base or bed plate provided with a slot, C', extending nearly throughout its length at its middle. The base C is provided on each side of the slot C' with a graduated scale representing size-numbers, and at each edge on its face with a graduated scale of inches. This scale of inches is also represented on the vertical sides of the base, as shown in Fig. 1.

At the rear end of the base C is secured a concave heel-piece, D—that is to say, it is concave on its inner face, and is metal lined, as shown at $a$, Fig. 2. Between the lining $a$ and heel-piece D is secured a vertical metal scale, H, graduated, as shown, and extending up sufficiently high to reach some distance along the calf of the leg of a person whose foot is being measured.

A slide, I, fits over the scale H, and is slotted to receive a tape-measure, I'. The slide I is provided with a set-screw, $I^2$, by which it may be secured to the scale H at any desired point on the same.

At the front of the base C, and adjustable in the slot C', is a graduated vertical standard, E, attached to a sliding base, E', provided with a set-screw, G, which passes through the base E' and the slot C' into a plate, $E^2$, working in a rabbet in the under face of the base C. In the rear face of the vertical standard E, in a vertical recess, $b$, is secured a flat spring, $d$, the force of which is exerted outwardly to hold in place the vertically-sliding plate F.

The measure is operated in the following manner: The foot is placed on the base C, the heel resting in the concave heel-piece D, and the toe-gage is moved up to take the length of the foot, and the set-screw G is tightened to hold the toe-gage in place. To measure the toes the sliding plate F is permitted to fall upon them by retracting the spring $d$, which will permit the plate to slide down the vertical standard E, and when the measure has been ascertained the spring $d$ will be released and will hold the plate F at the point to which it has been adjusted. To measure the ankle and calf the tape I' is used, and the slide I is moved upon the scale H to the proper point, and secured by the set-screw $I^2$, after which the measure at this point may be taken. An ordinary tape not connected with the measure is employed to take the span of the foot, and during this operation corns and bunions may be located and noted in the record of the measure by means of the scale of inches at the sides of the base C.

I have shown in Figs. 5, 6, and 7 the pattern of the upper after it is cut from the measure above described and the pattern-chart and pattern by which the lines may be accurately cut. They, however, form no part of the invention, and are not claimed herein.

The graduated last shown in Fig. 1 is used in building up the last to stretch the pattern on, and by trying the measure of the foot upon the last the last may be built by piecing to the exact conformation of the foot. The last, however, forms no part of this invention, and is shown only to illustrate the manner of working the measure.

Having thus fully described my invention, what I claim as new, and desire to secure by Letters Patent of the United States, is—

1. In a measure for boots and shoes, the toe-gage consisting of the vertical graduated standard E, rising from the base E', and provided with the vertical recess $b$ and the spring $d$, and the slide F, constructed, combined, and operating substantially as and for the purposes set forth.

2. In a measure for boots and shoes, the heel-piece D, having the metal-lined inner concave face, $a$, in combination with the vertical scale H, extending to the calf of the person to be measured, and the tape I' in the slide I, provided with the set-screw I², constructed and operating substantially as and for the purposes set forth.

3. In a measure for boots and shoes, the combination of the base C, having the slot C' and the scales of sizes and inches located as described, the toe-gage consisting of the vertical graduated standard E, spring $d$, recess $b$, sliding plate F, and set-screw G, the heel-piece D $a$, scale H, and slide I, tape I', and set-screw I², all constructed and operating substantially as and for the purposes set forth.

CHARLES SCHAEFER.

Witnesses:
LAWRENCE WIRR,
WM. WIESE.